United States Patent Office 3,477,787
Patented Nov. 11, 1969

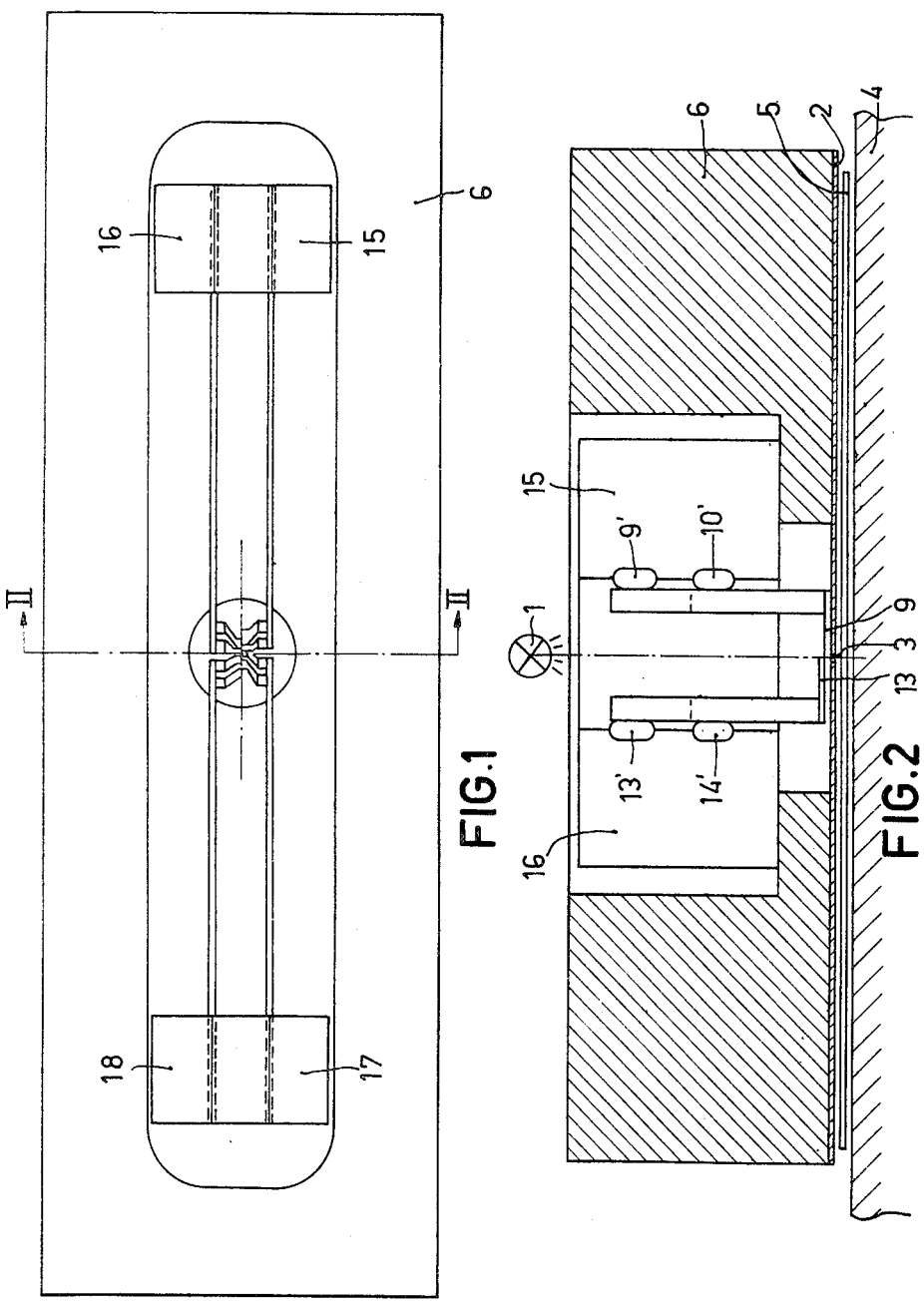

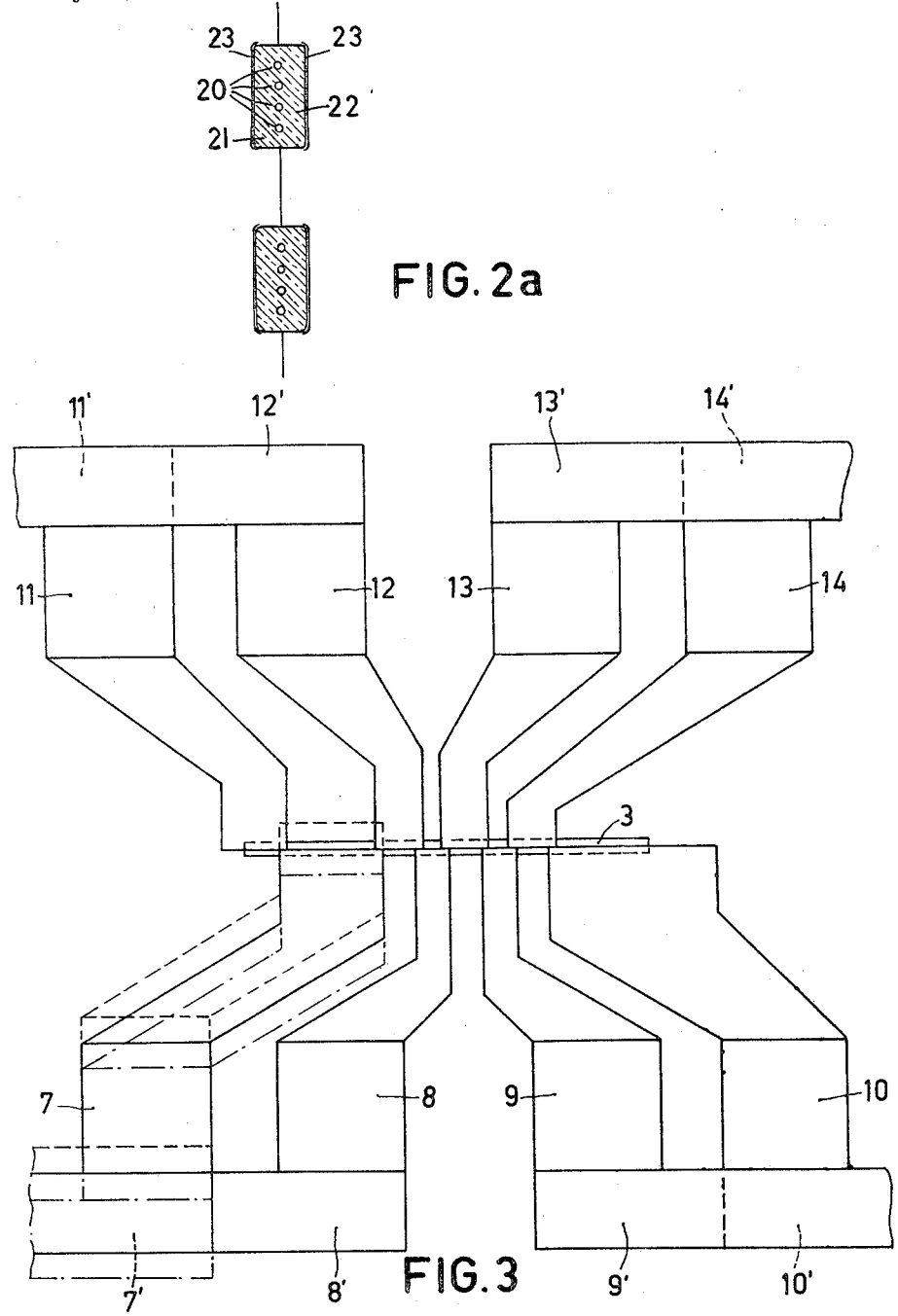

3,477,787
PIEZO ELECTRIC SHUTTER
Bernardus Antonius Carolus van der Wijngaart, Marius Quirijnen, and Marinus Gijsbertus Knigge, Apeldoorn, Netherlands, assignors, by mesne assignments, to U.S. Philips Corporation, a corporation of Delaware
Filed May 27, 1966, Ser. No. 553,408
Claims priority, application Netherlands, June 4, 1965, 6507114
Int. Cl. G03b 27/76, 9/02; G02f 1/30
U.S. Cl. 355—71                                6 Claims

ABSTRACT OF THE DISCLOSURE

An apparatus for illuminating a light-sensitive layer according to a given pattern. The pattern is produced by the controlled movement, in response to applied voltage, of piezo-electric elements having attached shutter members. The shutter members can be moved to various positions over an aperture thus forming an illumination pattern with the light passing through the aperture.

---

The invention relates to a shutter for illuminating a light-sensitive layer according to a given pattern useful in the manufacture of printed circuit boards.

In a known device of the kind to which the present invention relates, the shutter members are operated with the aid of electromagnets and a mechanical transmission. However, the speed with which this known shutter operates is limited and it is strongly subjected to wear.

A shutter according to this invention does not exhibit the said disadvantages.

Briefly described, a shutter of this invention is characterized in that each of the shutter members is secured to the end of a piezo-electric rod-shaped element which extends parallel to a slot-shaped aperture, the other end of each of the piezo-electric elements is connected with a stationary part of the apparatus. Each of the shutter members, in the neutral position, close half of the slot-shaped aperture in the transverse direction, while each of the piezo-electric rod-shaped structural elements is provided with electrodes so that when a voltage is applied to these electrodes, the free end and the shutter member secured thereto are displaced with respect to the neutral position thereof. The electrodes of each structural element can be connected with a device which supplies the voltages required for a desired illumination pattern.

An object of this invention is to provide a shutter having a particularly high operational speed, since the piezo-electric elements respond substantially immediately to applied voltage, and the mass of the moving parts may be very small so that the inertia forces are therefore also small. Such a shutter is particularly useful for providing a pattern of lines on a light sensitive layer, for example, in the manufacture of printed wiring circuits. Due to miniaturisation, the thickness of lines and the distance between the lines of a circuit board must be very small. A further object therefore is to provide a shutter which can produce the small line dimensions readily and the piezo-electric structural parts occupy little space.

A further advantage of the invention is that the electrodes of the piezo-electric elements may be connected with a computer which supplies a voltage to relevant piezo-electric elements according to a given program.

In a particularly advantageous embodiment of the invention, adjacent shutter members are located on different sides of the slot-shaped aperture and are partly overlapped so that the aperture is completely closed when desired.

The above and other features, objects and advantages of the present invention will be fully understood from the following description considered in connection with the accompanying illustrative drawings.

FIG. 1 is a plan view of a shutter according to the invention on an enlarged scale.

FIG. 2 is an enlarged sectional view, taken on line II, II of FIG. 1.

FIG. 2 is a cross-sectional view of a piezo-electric element.

FIG. 3 shows on a greatly enlarged scale a plan view of the shutter of FIG. 1.

Figure 4:
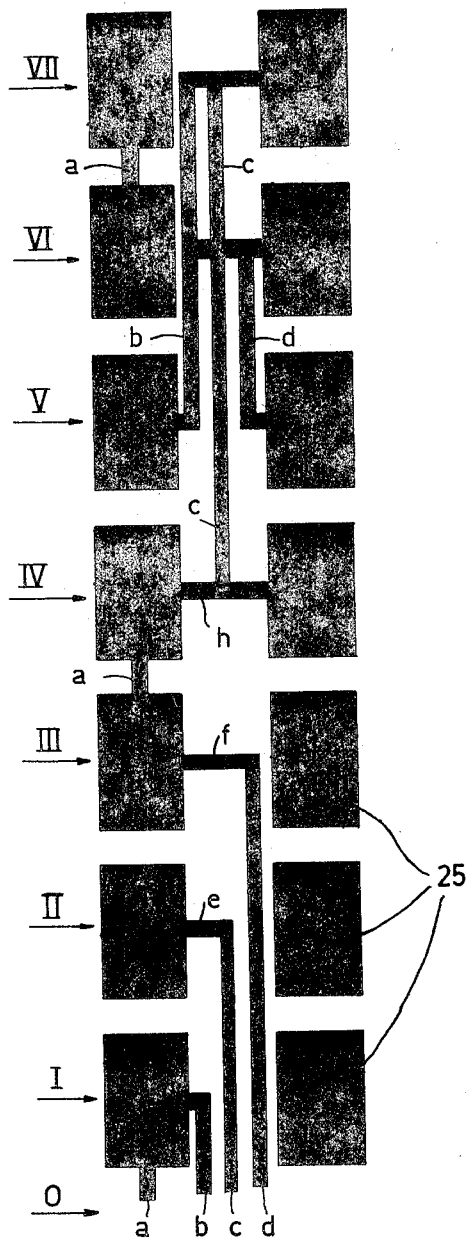
FIG. 4 shows on an enlarged scale part of a pattern of lines that can be obtained with the device shown in the preceding figures.

In the drawing, reference numeral 1 designates a light source which is arranged above a shutter. The shutter has a plate 2 which is provided with a slot-shaped aperture 3 (see FIG. 3). A supporting member 4 is provided in spaced relation with and at the side of the plate 2 remote from the light source 1. The plate 2 and the supporting member 4 are separated to provide a space through which a support 5, with a light-sensitive layer is moved by any suitable means. This movement is in the plane at FIG. 1 and normal to this plane in FIG. 2. The plate 2 is secured to the structural part 6. The shutter members 7, 8, 9, 10, 11, 12, 13 and 14 are disposed between the light source 1 and the plate 2. These shutter members have such dimensions that they can be moved to cover the slot 3 completely. The shutter members are each secured at one end of each of the rods 7', 8', 9', 10', 11', 12', 13' and 14' made of piezo-electric material. These rods are secured pairwise at their opposite ends to blocks 15, 16, 17 and 18 which are in turn connected with the structural part 6. The rods 7' to 14' inclusive have the form shown on an enlarged scale in FIG. 2a. Each of the rods is provided with a plurality of cavities or bores, 20 extending in the longitudinal direction of the rods and which divide each rod into two halves 21 and 22. Each of the rod halves 21 and 22 is provided with an electrode 23. When a voltage is applied to these electrodes, rod halves 21 and 22 are polarized in opposite senses so that the rod assumes a bent position. The direction of bending of the rod is dependent upon the voltage applied.

The electrodes of each rod are connected with a device (not shown) which supplies the voltages required for the desired pattern.

It should be appreciated that the cross-sections of the rods may also have shapes different from that shown in FIG. 2a. As a matter of course, also other embodiments of piezo-electric rods of the bending type may be used.

As is apparent from FIG. 3, the shutter members 7–14 in the neutral position close half of the slot-shaped aperture 3 in the transverse direction, while adjacent shutter members such as the elements 7 and 11 or 12 are each located on different sides of the slot-shaped aperture and overlap each other in part. This disposition of adjacent elements on different sides of the aperture 3 has the advantage that the structure is less complicated and that the elements are substantially not in contact with each other. Also satisfactory closure of the aperture 3 from the light source is ensured by the overlapping of adjacent elements.

FIG. 4 shows on an approximately ten times enlarged scale a part of a pattern of lines that can be obtained with the aid of the device shown in the preceding figures. The contact areas 25 may be pre-printed and must be interconnected according to a given pattern of lines.

In the situation O, the shutter members 11, 12, 13 and 14 are opened while the shutter members 7, 8, 9 and 10 are closed. Therefore, as the support 5 moves relative to the aperture 3 the four vertical lines a, b, c, d are formed.

In situation I, shutter member a opens momentarily and then immediately closes again. Thus, a transverse line is obtained connecting the lower left pre-printed block with line a and having approximately the same thickness as line a. The shutter members 13 and 14 remain opened, while the members 11, 12, and 7 have closed and members 8, 9 and 10 remain in the closed position. As a result lines a and b are terminated and lines c and d extended.

In situation II, the shutters 11, 12, 7 and 8 open just for an instant and then close again forming line e. The members 11, 12, 13, 7, 8, 9 and 10 are closed, while the shutter member 14 remains open and only line d is extended.

In situation III, the shutter members 11, 12, 13, 7, 8 and 9 open momentarily and then close again forming line f. The shutter member 11 remains open now while the shutter members 12, 13, 14, 7, 8, 9 and 10 are closed. As support 5 moves from situation III to IV line a is again formed.

In situation IV, the shutter members 11, 12, 13, 14, 7, 8, 9 and 10 open momentarily and then close again with the exception of the shutter member 13 which remains open. Therefore, line h is formed and line c is again formed.

In situation V, the shutter members 12, 14, 7 and 10 open momentarily and then 7 and 10 close again. The shutter 12 and 14 remain open with shutter 13 and the shutter members 11, 7, 8 and 9 remain closed.

In situation VI, the shutter members 12, 13 and 14 are open and shutter 8, 9, and 10 open momentarily. Shutter 8, 9 and 10 close again together with shutter 14 while shutter member 12 and 13 remain open. The shutter members 14, 7, 8, 9 and 10 are closed, between situations VI and VII.

Finally, in situation VII, the shutter members 11, 12, 13, 14, 8, 9 and 10 open momentarily (shutter 7 remains closed) and then close again, whereupon all the shutter members remain closed as the support progresses beyond situation VII.

It will be apparent from the foregoing that any desired pattern of lines can be obtained with the aid of the device described hereinbefore, and when it is considered that FIG. 4 shows a ten times enlarged practical form, it will be evident that a very fine pattern of lines can be obtained with the device described.

In such a pattern of lines, not only lines in the direction of movement of the light-sensitive layer of support 5 must be illuminated, but transverse connections must also be provided between the lines. These transverse connecting lines must have substantially the same thickness as the other lines. In accordance with the invention, these transverse connections can be obtained in that the relevant shutter members are opened just for an instant and are then immediately closed again. The high speed of closing ensures that the transverse lines have substantially the same width as the other lines.

The drawing shows a device having 8 shutter members. This number may of course be enlarged or reduced according to a specific application. Of course, the shape and dimensions of the shutter members may also be different from those in the embodiment shown.

When rod-shaped piezo-electric elements of the bending type are used, a sufficiently great displacement of the shutter members is obtained at comparatively low voltages. The displacement take place substantially immediately after the application of a voltage so that the operational speed of the shutter is very high.

While I have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What is claimed as new and useful and secured by Letters Patent of the United States is:

1. Apparatus for making lines on a light sensitive layer movable transversely relative to a stationary member having an elongated opening through which light rays pass onto said layer comprising shutter means adjacent said opening for intercepting light rays in one position thereof overlying said opening; said shutter means comprising a plurality of shutter elements, piezo-electric means connected with each one of said shutter elements, electrode means coupled with each said piezo-electric means for moving said piezo-electric means and the associated shutter elements transversely relative to said opening.

2. Apparatus according to claim 1 wherein said shutter elements extend transversely of said opening from each side thereof.

3. Apparatus according to claim 2 wherein said shutter elements at least partly close said opening in the neutral position of said piezo-electric rods.

4. Apparatus according to claim 2 wherein adjacent shutter elements in said one position thereof closing said opening overlap one another.

5. Apparatus according to claim 2 wherein said piezo-electric means comprise elongated rod shaped members extending in a direction substantially parallel with the longitudinal axis of said opening, stationary means coupled with one end of said rod members, said shutter elements being connected with the other end of said rod members.

6. Apparatus according to claim 5 wherein said rod-shaped members are provided with a plurality of longitudinally extending bores, said bores being placed on a major axis of said rods in spaced parallel relation, said electrodes being coupled with the exterior surface of each said rod on opposite sides in planes parallel with said bores.

References Cited

UNITED STATES PATENTS 3,103,849   9/1963   Wise ---------------- 88—24

NORTON ANSHER, Primary Examiner

R. A. WINTERCORN, Assistant Examiner

U.S. Cl. X.R.

95—64; 350—269